United States Patent [19]
Myers et al.

[11] Patent Number: 5,581,677
[45] Date of Patent: Dec. 3, 1996

[54] CREATING CHARTS AND VISUALIZATIONS BY DEMONSTRATION

[75] Inventors: Brad A. Myers; Jade G. Biagioni, both of Pittsburgh, Pa.; Matthew A. Goldberg, Rockaway, N.J.

[73] Assignee: Carnegie Mellon University, Pittsburgh, Pa.

[21] Appl. No.: 232,524

[22] Filed: Apr. 22, 1994

[51] Int. Cl.⁶ ........................................... G06T 11/00
[52] U.S. Cl. ........................................ 395/140; 395/326
[58] Field of Search ................................. 395/140, 148, 395/161, 925, 155, 145, 147

[56] References Cited

U.S. PATENT DOCUMENTS

| | | |
|---|---|---|
| 4,578,766 | 3/1986 | Caddy . |
| 4,674,042 | 6/1987 | Hernandez et al. . |
| 4,674,043 | 6/1987 | Hernandez et al. . |
| 4,800,510 | 1/1989 | Vinberg et al. . |
| 4,847,785 | 7/1989 | Stephens . |
| 4,852,019 | 7/1989 | Vinberg et al. . |
| 4,964,043 | 10/1990 | Galvin . |
| 4,996,654 | 2/1991 | Rosenow . |
| 5,050,221 | 9/1991 | Ohta et al. . |
| 5,228,119 | 7/1993 | Mihalisin et al. . |
| 5,231,577 | 7/1993 | Koss . |
| 5,255,363 | 10/1993 | Seyler . |
| 5,375,201 | 12/1994 | Davoust .............................. 395/161 |
| 5,461,708 | 10/1995 | Kahn ................................. 395/140 |

OTHER PUBLICATIONS

Roman et al, "A Taxonomy of Program Visualization Systems", *Computer Magazine,* vol. 26, No. 12, Dec. 1993, pp. 11–24.

Stasko, "Tango: A Framework and System for Algorthm Animation", *Computer Magazine,* vol. 23, No. 9, Sep. 1990, pp. 27–39.

Robert Barr. "Using Graphs to Explore Databases and Create Reports." *SIGCHI Bulletin 22,* 1 (Jul. 1990), 24–27.

Stephen M. Casner. "A Task–Analytic Approach to the Automated Design of Graphic Presentations." *ACM Transactions on Graphics 10,* 2 (Apr. 1991), 111–151.

Allen Cypher. EAGER: Programming Repetitive Tasks by Example. Human Factors in Computing Systems, Proceedings SIGCHI '91, New Orleans, LA, Apr. 1991, pp. 33–39.

Scott Hudson and Chen–Ning Hsi. A Synergistic Approach to Specifying Simple Number Independent Layouts by Example. Human Factors in Computing Systems, Proceedings INTERCHI '93, Amsterdam, The Netherlands, Apr. 1993, pp. 285–292.

David Kurlander and Eric A. Bier. Graphical Search and Replace. Computer Graphics, Proceedings SIGGRAPH '88, Atlanta, GA, Aug. 1988, pp. 113–120.

Jock Mackinlay. "Automating the Design of Graphical Presentation of Relational Information." *ACM Transaction on Graphics 5,* 2 (Apr. 1986), 110–141.

David L. Maulsby and Ian H. Witten. Inducing Procedures in a Direct–Manipulation Environment. Human Factors in Computing Systems, Proceedings SIGCHI '89, Austin, TX, Apr. 1989, pp. 57–62.

Brad A. Myers. *Creating User Interfaces by Demonstration.* Academic Press, Boston, 1988.

Brad A. Myers. "Taxonomies of Visual Programming and Program Visualization." *Journal of Visual Languages and Computing* 1, 1 (Mar. 1990), 97–123.

(List continued on next page.)

*Primary Examiner*—Almis R. Jankus
*Attorney, Agent, or Firm*—Merchant, Gould, Smith, Edell, Welter & Schmidt, P.A.

[57] ABSTRACT

A system and method to automatically produce a display chart from example graphics and data values. New or existing example graphics are drawn with a programmable data processing system, and the drawn graphical elements within the chart are identified. A data value is then associated with at least one of the graphical elements, and a list of heuristics are applied to determine the visualization characteristics for the graphical elements. The display chart is then produced incorporating the visualization characteristics for the graphical elements.

27 Claims, 12 Drawing Sheets

OTHER PUBLICATIONS

Brad A. Myers, Dario A. Giuse, Roger B. Dannenberg, Brad Vander Zanden, David S. Kosbie, Edward Pervin, Andrew Mickish, and Philippe Marchal. "Garnet: Comprehensive Support for Graphical, Highly–Interactive User Interfaces." IEEE Computer 23, 11 (Nov. 1990), 71–85.

Brad A. Myers. Text Formatting by Demonstration. Human Factors in Computing Systems, Proceedings SIGCHI '91, New Orleans, LA, Apr. 1991, pp. 251–256.

Brad A. Myers. "Demonstrational Interfaces: A Step Beyond Direct Manipulation." *IEEE Computer 25,* 8 (Aug. 1992), 61–73.

Brad A. Myers, Richard G. McDaniel, and David S. Kosbie. Marquise: Creating Complete User Interfaces by Demonstration. Human Factors in Computing Systems, Proceedings INTERCHI '93, Amsterdam, The Netherlands, Apr. 1993, pp. 293–300.

Brad A. Myers, Richard Wolf, Kathy Potosnak, and Chris Graham. Heuristics in Real User Interfaces. Human Factors in Computing Systems, Proceedings INTERCHI '93, Amsterdam, The Netherlands, Apr. 1993, pp. 304–307.

Steven F. Roth and Joe Matthis. Data Characterization for Intelligent Graphics Presentation. Human Factors in Computing Systems. Proceedings SIGCHI '90, Seattle, WA, Apr. 1990, pp. 193–200.

John T. Stasko. Using Direct Manipulation to Build Algorithm Animations by Demonstration. Human Factors in Computing Systems, Proceedings SIGCHI '91, New Orleans, LA, Apr. 1991, pp. 307–314.

John Stasko, Albert Badre, and Clayton Lewis. Do Algorithm Animations Assist Learning? An Empirical Study and Analysis. Human Factors in Computing Systems, Proceedings INTERCHI '93, Amsterdam, The Netherlands, Apr. 1993, pp. 61–66.

Edward R. Tufte. *The Visual Display of Quantitative Information.* Graphics Press, Cheshire, Conn., 1983, p. 30.

D1.1 GRAPHICAL OBJECT
D1.2    LEFT
D1.3    TOP
D1.4    WIDTH
D1.5    HEIGHT
D1.6    INSIDE-COLOR
D1.7    OUTLINE-COLOR
D1.8    ... (OTHER GRAPHICAL PROPERTIES

D1.9    TYPE OF CHART USED IN
D1.10   LIST OF LINK BOXES ATTACHED TO THIS OBJECT
D1.11   LIST OF AXES FOR THIS OBJECT
D1.12   LIST OF OTHER OBJECTS IN THE GROUP
D1.13   LIST OF OTHER OBJECTS ATTACHED TO THIS OBJECT

D2.1 LINK BOX
D2.2    POINTER TO SPREADSHEET CELL
D2.3    POINTER TO GRAPHICAL OBJECT

D3.1 AXIS
D3.2    X1, Y1
D3.3    X2, Y2
D3.4    SCALING FACTOR
D3.5    LINK BOX FOR THIS AXIS
D3.6    LIST OF OBJECTS DEPENDENT ON THIS AXIS
D3.7    LIST OF RANGES OF SPREADSHEET CELLS USED FOR THIS AXIS
D3.8    TIC MARK SPACING INFORMATION
D3.9    LIST OF ASSOCIATED TIC MARK OBJECTS
D3.10   LABELING INFORMATION
D3.11   LIST OF ASSOCIATED LABEL OBJECTS

D4.1 SPREADSHEET CELL
D4.2    VALUE
D4.3    LIST OF OBJECTS USING THIS VALUE

D5.1 GLOBAL VARIABLES
D5.2    LIST OF OBJECTS WITH ASSIGNED CELLS NOT YET GENERALIZED

Fig. 1

CREATING CHARTS AND VISUALIZATIONS BY DEMONSTRATION

FIELD OF THE INVENTION

The present invention relates to graphical computer systems, and more specifically to a system and method for producing a display chart from example display graphics and data values.

BACKGROUND OF THE INVENTION

When users want a chart or graph of their data in personal computer programs, they typically select the range of data, and the system uses simple heuristics to automatically display the data in a chart. Alternatively, the user typically can select from a menu of pre-defined chart types. However, if the system does not choose correctly, and the built-in charts are not appropriate, then it is usually quite difficult for users to specify the desired pictures. Typically, many complex dialog boxes and commands must be used. This is a significant recognized problem with all of these programs, which so far has not been solved. Some commercially available spreadsheet programs provide a set of question-and-answer dialogs. However, this can be tedious and still does not provide the user with sufficient flexibility to easily specify desired displays. Creating custom displays is also difficult with commercially available scientific visualization systems. In these, code must be written, either using conventional or visual programming languages.

The visualization problem is particularly difficult when there are multiple data values that need to be displayed in the same or linked graphs. Also, there is evidence to show that when users construct their own visualizations, they understand the data better than when a visualization is produced for them. Further, a single display is often insufficient, and users typically need to explore the data by changing display types, zooming, rescaling and aggregating data.

A number of systems have investigated how to automatically produce an appropriate and attractive display given the properties of the data. Examples of this type include (APT), (SAGE), (BOZ), commercial products like spreadsheets (MICROSOFT EXCEL), (LOTUS 1-2-3), and interactive graphing packages (DELTAGRAPH). The commercial products also provide large libraries of built-in displays. One commercial graphing package provides a small amount of direct interactivity with the graphs through techniques like expanding bars that represent aggregates of data by double-clicking on them. Another system uses heuristics to automatically pick the chart type and to resolve mappings to data.

Scientific visualization is a form of data visualization that presents large amounts of data generated by some scientific observation or simulation. Many of today's scientific visualizations are produced using programming libraries of routines, so the users must write code to specify the desired graphics. Sometimes, a charting routine from a library can be used, but if these are flexible, they generally require specifying lots of complex parameters. Most interactive scientific visualization tools use a dataflow model, where the user graphically wires together nodes that process the data. To specify the particular types of display, the user wires the outputs to a charting icon chosen from a large library. These icons typically have many parameters which can be set using dialog boxes or by wiring in the appropriate data. It is usually not possible to directly manipulate the generated pictures to change the display (other than simple manipulations like rotation and moving a clipping plane).

Many demonstrational systems have been created for other domains, such as user interface construction, technical drawing, text editing, and automating repetitive actions. One research system that has begun exploring demonstrational visualization allows the user to draw one example of the layout for objects, and the system generalizes to any number of objects. This system is quite limited, however, and only deals with the layout of rectangles in hierarchies.

The term "data visualization" also applies to systems that create pictures of data from running programs, to help with debugging and understanding. One system that uses demonstrational techniques in an editor to specify algorithm visualizations allows users to draw pictures for the graphical elements and attach preprogrammed "path" animations to control the behaviors. However, the pictures for algorithm visualization are quite different from those of business graphics.

Therefore, to solve these problems, there is a need for a simple way to interactively create new business charts or edit existing charts.

SUMMARY OF THE INVENTION

In one form of the invention, the present system and method automatically produces a display chart from example graphics and data values. New or existing example graphics are drawn with a programmable data processing system, and the drawn graphical elements within the chart are identified. A data value is then associated with at least one of the graphical elements, and a list of heuristics are applied to determine the visualization characteristics for the graphical elements. The display chart is then produced incorporating the visualization characteristics for the graphical elements.

If more than one graphical element is identified, differences between the graphical elements are optionally identified and a data value is associated with each difference. A list of heuristics is then applied to the differences to determine the visualization characteristics for the differences.

A special marker graphical element may optionally be placed on the example chart and associated with a data value. A list of heuristics are then applied to the special marker graphical element to determine a visualization characteristic to highlight the data value.

The display chart is updated to reflect any changes in the data values.

BRIEF DESCRIPTION OF THE DRAWINGS

FIG. 1 is a list of data structures and objects compatible with the present invention.

DETAILED DESCRIPTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

The specification for the present invention described herein includes the present description, the drawings and a microfiche appendix. In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

A typical composite graph that summarizes many numbers, discussed in the following text, is given by Edward R. Tufte, *The Visual Display of Quantitative Information*, Graphics Press, Cheshire, Conn., 1983, p. 30, reproduced from the *New York Times,* Jan. 11, 1981, p. 32, which is herein incorporated by reference ("Tufte Graph").
List of Heuristics The following preferred heuristics are used throughout this specification when describing the preferred embodiment:

H.1 To determine which axis a graphical object is associated with, and how many link-boxes to draw:

Loop through all the axes which have been drawn.

Figure 7:
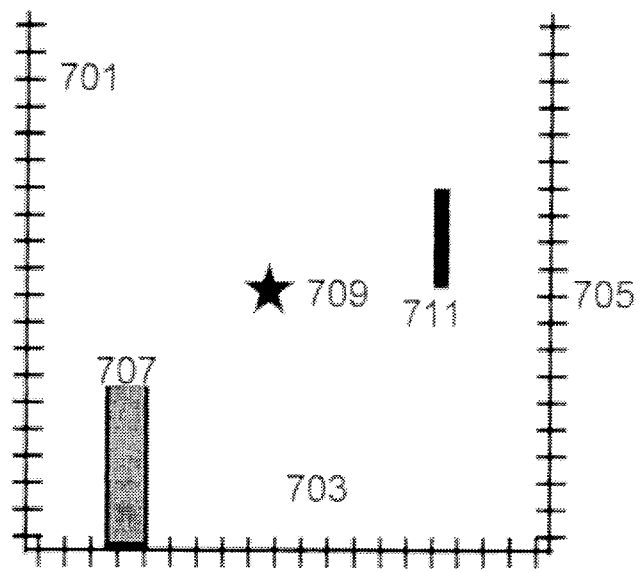
FIG. 7 is a graph showing a preferred finding of axes for objects.

If edge of the object is within a small distance (e.g., 20 pixels) of any axis, then assume the object is attached to that axis. (As shown by 707 in FIG. 7, which is close to axis 703.)

If no such axes found, then assume object is free-floating (e.g., the star 709)

Determine all the other axes that form a bounding box that the object is inside of (701, 703 and 705).

If the object is attached to an axis, then draw 1 link box at that axis (703 for object 707), and one link box at each other axis (705 and 701 for object 707).

If the object is free-floating, then:

If the object does not have the same height and width (e.g. it is a rectangle like 711) then assume it is controlled by its top and bottom, so generate two link boxes at each axis that is parallel to the longer dimension (here 705 and 701), and one link box at each axis parallel to the shorter dimension (here 703). A menu item is available if the user would prefer the object to be controlled instead by its center and length.

If the object has the same height and width (such as the star 709) then generate one link box at each axis.

Figure 8:
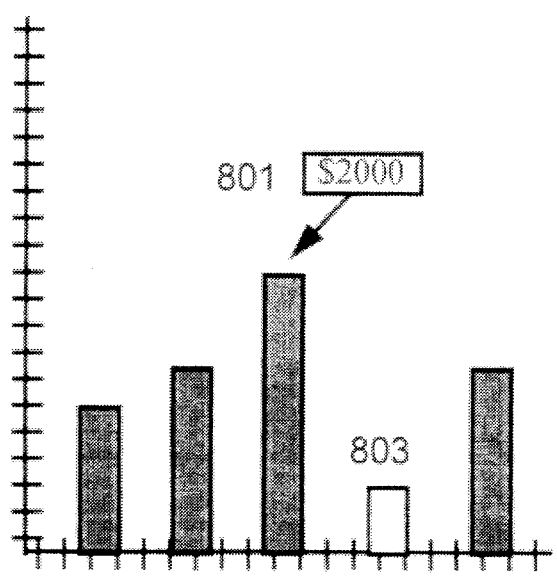
FIG. 8 is a graph showing preferred special markers for chart items.

H.2 To determine how a marker is related to the chart:

(A marker is usually an extra graphical object, or a set of objects, or a special highlighting of one of the chart elements that is used to highlight a particular chart value. For example, 803 in FIG. 8 shows an arrow and a label as a marker for the highest value, and 803 shows a color change used to highlight the lowest value).

If the graphical object attached to the marker is the highest or lowest value of the data, then assume that the marker should remain attached to the chart graphic showing the highest or lowest value.

Otherwise, assume that the marker should remain attached to the specific chart item shown.

If the marker contains a string, then if the string contains the value associated with the chart item (like 801 contains the string "$2000"), then assume that the string should be updated whenever the value associated with the chart element changes.

H.3 To determine the extent of the data in the spreadsheet:

If a group of cells or an entire row or column is selected, then

If the selected group (or row or column) starts off with cells containing strings and then switches to numbers, then assume that the strings are titles, and use the numbers.

Otherwise start with the first cell of the group.

Search down from the start point until a cell is found that is blank or contains a value of a different type (e.g., if the cells contain numbers, and a string is found). The cell before the change is the last cell to use.

If a single cell is selected and the adjacent cell found in the global list D5.2, shown in FIG. 1, is to the right or left, then assume the cells form a horizontal row.

If the type of the data in the selected and adjacent cells (e.g., numbers or strings) is different, then error.

Else, search right until a cell is found that is blank or of a different type.

Then the range of cells is the left-most of the selected or adjacent cells to the right-most cell found with the same type.

If a single cell is selected and the adjacent cell found in the global list D5.2 is to the top or bottom, then assume the cells form a vertical column.

If the type of the data in the selected and adjacent cells (e.g., numbers or strings) is different, then error.

Else, search down until a cell is found that is blank or of a different type.

Then the range of cells is the top-most of the selected or adjacent cells to the bottom-most cell found with the same type.

H.4 To determine the type of bar chart:

(This typically uses the information determined by the preferred heuristics H.1 to further decide how to draw the rest of the chart.)

If an object is on top of another object for a vertical column chart, or to the right for a horizontal bar chart, then assume a stacked chart.

Figure 2A:
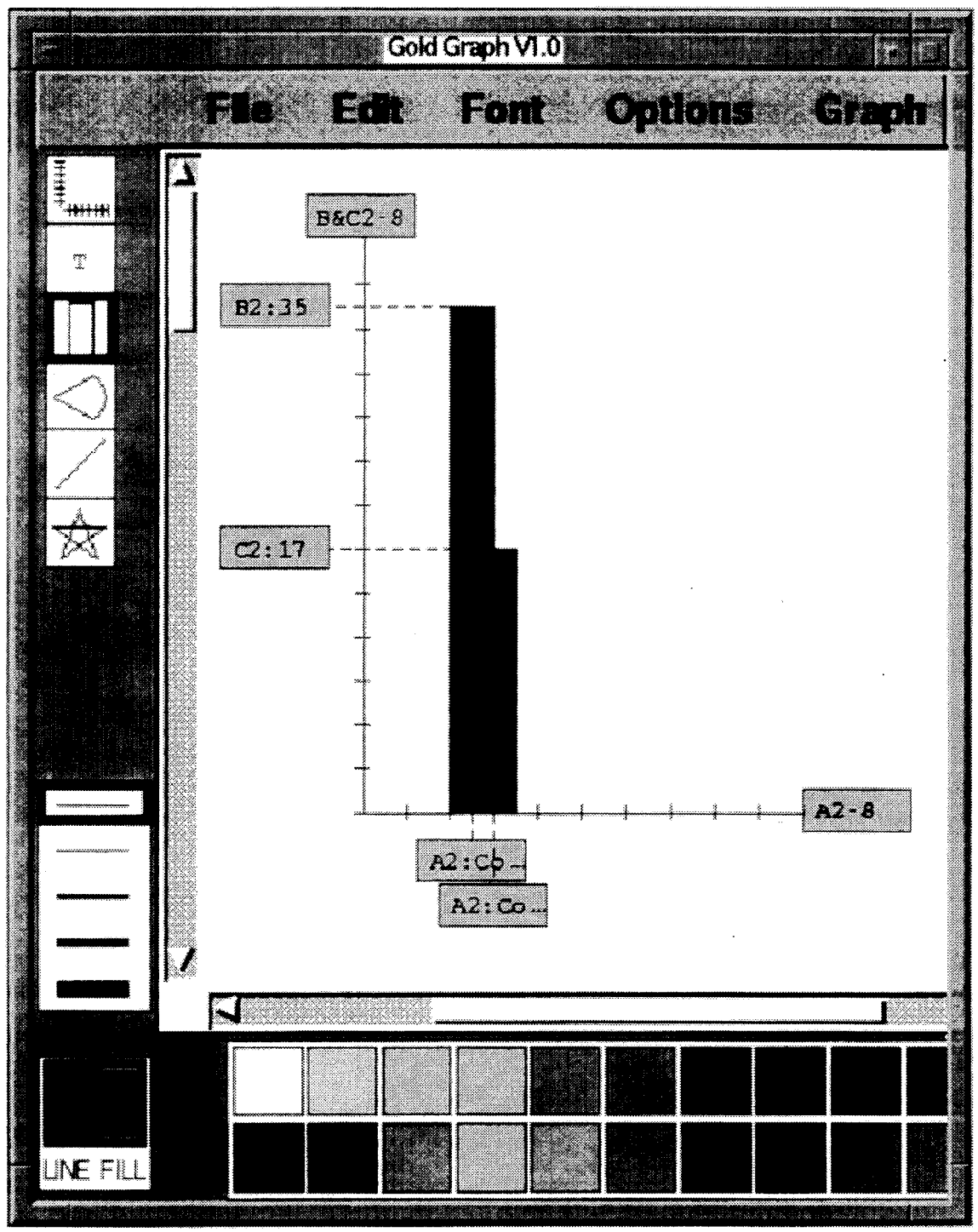
FIG. 2a is a screen display of a preferred interface showing a paired column graph being constructed and link-boxes attached to the graphics.
Figure 3A:
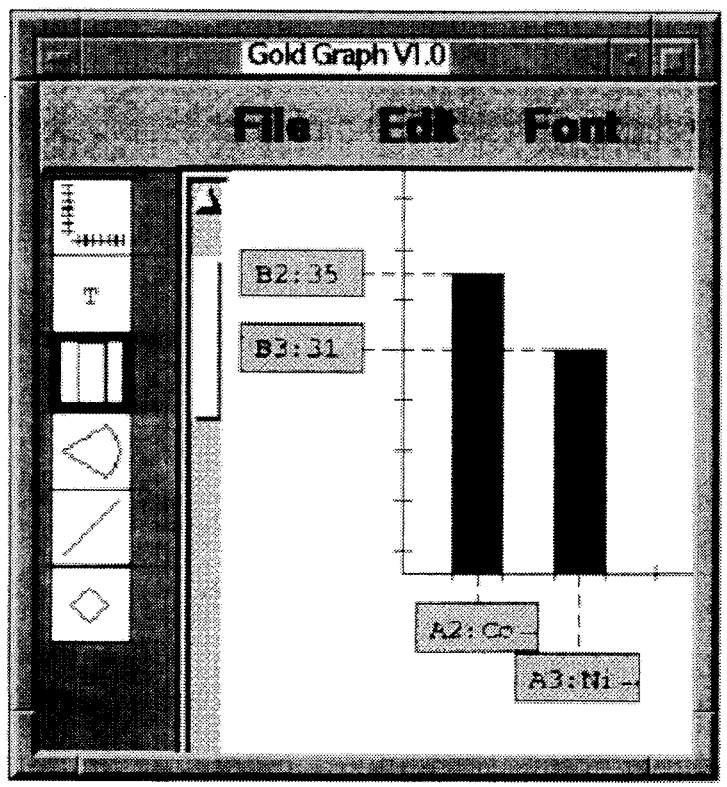
FIGS. 3a, 3b and 3c are screen displays of a typical user drawn chart, color key, and resulting chart where the color of the bars corresponds to a country (FIG. 2b, column D) and the height corresponds to the price (FIG. 2b, column B).

If there is a set of objects which have about the same bottoms and overlap or touch horizontally for a vertical column chart (as shown in FIG. 2a) or have the same lefts and touch vertically for a horizontal bar chart, and the objects are associated with different data series, then assume a paired bar chart.
Otherwise, it is a normal bar chart.
H.5 To determine the colors to use:
(These heuristics are also typically used to determine the line-style, font, and other graphical properties of objects.)
If there is only one example object or the example objects have the same color, use that color for all the generated objects.
Otherwise:
If there are paired (matched) objects with different colors, but objects in the same series are the same color (as shown in FIG. 2a), then assume the color is used to differentiate the different series and use the example colors for all objects in each series.
Otherwise, assume the colors should be mapped to data values. Generate a color key (as shown in FIG. 3b) for the example colors with link boxes for the associated data.
If the mapping of colors to values is known, then color the generated graphics appropriately.
If not enough colors have been supplied by example, then pick other colors that are visually distinct from the example colors. The user can edit the colors later, if desired.
H.6 To determine the shapes and sizes to use:
(These heuristics are typically used for scatter plots, to see if the shape and sizes of the objects encodes data.)
If there is only one example object or the example objects have the same shape, use that shape for all the generated objects.
Otherwise, assume the shapes should be mapped to data values. Generate a shape key for the example shapes with link boxes for the associated data.
If the mapping of shapes to values is known, then use the appropriate shapes for the generated graphics.
If not enough shapes have been supplied by example, then pick other shapes that are visually distinct from the examples. The user can replace the shapes later, if desired.
If there is only one example object or the example objects have the same size, use that size for all the generated objects.
Otherwise, assume the size should encode some data. Since size is a continuously variable parameter, assume that it will map to a range. Generate a key that shows the minimum and maximum sizes and the corresponding minimum and maximum data values.
If the objects are text strings, then if the string value contains the value from the spreadsheet associated with the object, then assume that the string value should be modified based on values from the spreadsheet.
H.7 To determine the labeling of the axes:
(These heuristics are typically used for when graphical objects are placed near or across the axes, or when one of the axes labels is edited.)
If the object is a line segment that crosses the axis, then
If it goes all the way across the chart, assume the user wants lines across the entire chart.
If it is a short line, and it is shorter than other tic marks, assume it is a minor tic mark.
If it is a short line, but longer than other tic marks, assume it is a major tic mark.
Use the formatting (color, thickness, length) of the example object to format the other tic marks of the same category (major or minor).
If the object is a text string, then
If it is a number, then assume it is the numbering for the axes
If it is next to a major or minor tic mark, assume it is the formatting for that level.
Use the numeric value of the example numbers to determine the increment desired on the axes.
If it is a string, then
If it is a value from the spreadsheet, then assume it is a label for each item and generate appropriate labels for each chart item.
Otherwise, assume it is a label for the entire axis.
Use the formatting of the string (font, size, color, style) as the formatting for all labels of the same kind.
Description The present system is used to make specifying a custom visualization to a computer easy and straightforward. A user is able to quickly draw an example of the desired display, much like might what be done on a blackboard.

The preferred embodiment of the present invention presents an interface similar to conventional drawing programs. By using the conventional drawing operations the user is familiar with, the creation of custom charts straightforward. FIG. 2a shows a drawing area in the center, a palette of items that can be drawn on the left, a line and fill style palettes at the bottom, and pull-down menus at the top. There are three important additions over typical editors. First, the axis primitive at the top of the palette is used for drawing horizontal or vertical axes. Second, selecting on the mark item at the bottom of the palette (shown as a star in FIG. 2) displays a menu of marks that can be placed in the window. Selecting the drawing window then places a mark of a standard size, but pressing and dragging out a rectangle makes a mark of any desired size. Third, as each graphical element is drawn, a "link-box" is created which is used as feedback for what data is attached to that element. The link boxes are shown in FIG. 2a.

Figures 2B, 2C:
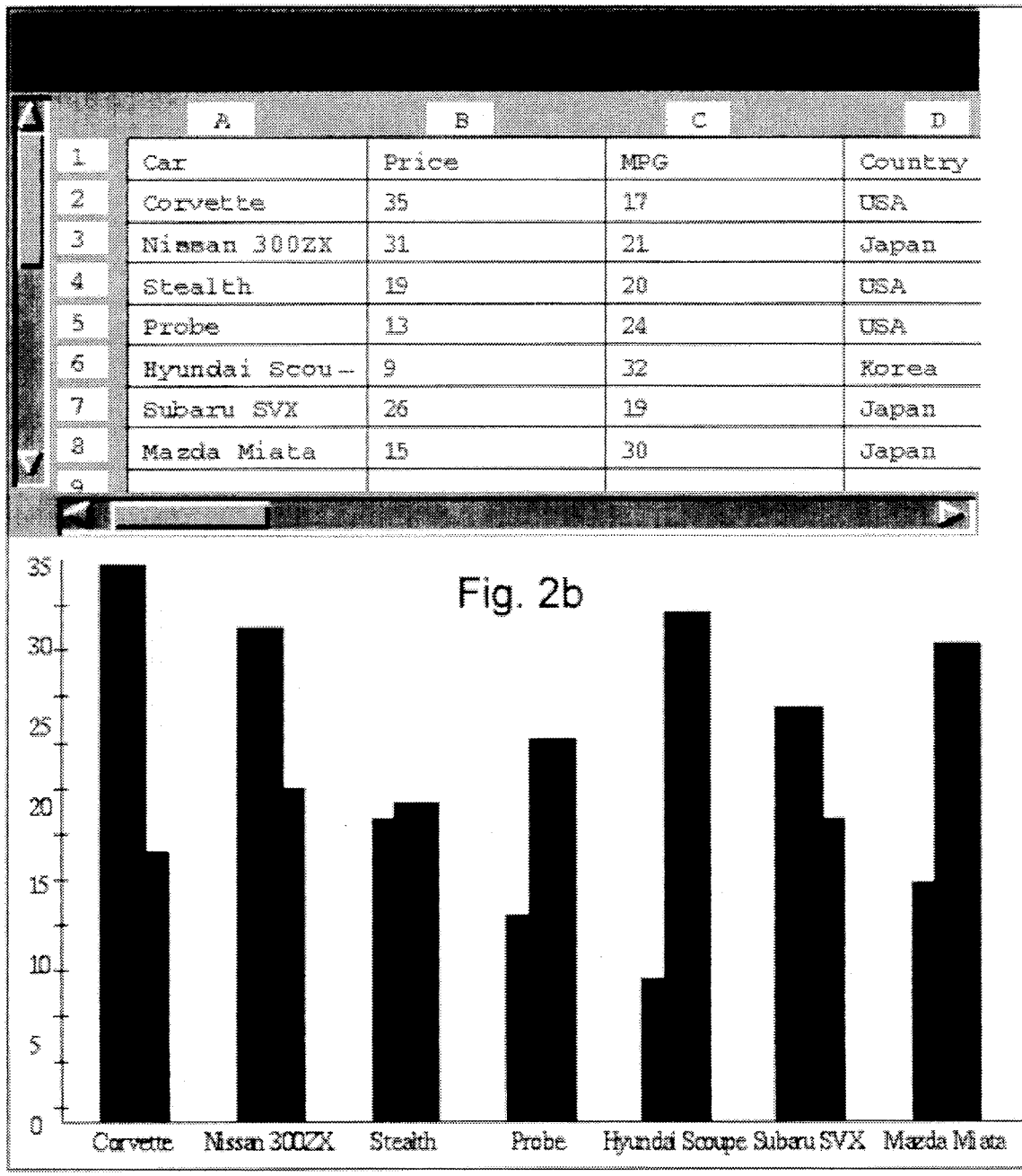
FIG. 2b is a screen display of a typical spreadsheet and data values.
FIG. 2c is a screen display of a typical resulting graph using all of the data.

The data for graphs is preferably displayed in a spreadsheet-like interface, shown in FIG. 2b. Data may be read from other spreadsheets, from databases, or from simulations. The user can select a link-box in the drawing window and then select cells, rows, and columns of data in the spreadsheet to specify that they are related.

EXAMPLE #1

To create a graph like FIG. 2c, the user typically would first draw the axes approximately the right length, and then draw on the left a single rectangle on the horizontal axes, and on the right a single rectangle overlapping in front of it, as shown in FIG. 2a. The link boxes preferably appear at each axis as the rectangles are drawn. The user might then select the left rectangle's link box, and then select cell B2 in the spreadsheet to be associated with that rectangle. Because the rectangle was drawn at the horizontal axis, it is assumed that a important graphical variable for the rectangle is the height, and therefore it is assumed that the value in the spreadsheet would be mapped into the height of the rectangle. However, the range of legal values is not yet known. Next, the user selects the right rectangle's link-box and selects cell C2. Based on this, it is assumed that the height of the left rectangles correspond to the column of values starting with B2, and that the height of the right rectangles corresponds to the column of values starting from C2. To find the end of the column in the spreadsheet, a heuristic is used where a downward search is performed from the selected cell until a cell is found with a different data type. If this guess is incorrect, the user is allowed to directly add or delete bars, or else edit the link-box associated with the axes, which shows the full range of values used. From the range of values in the spreadsheet, the minimum and maximum values are determined, the axes are set up and labeled, and the rectangles are drawn for all of the values in the spreadsheet. In the original example drawings, the user did not have to draw the rectangles at the correct heights based on the data; the heights are adjusted based on the actual data after the second example is provided.

EXAMPLE #2

Figure 3C:
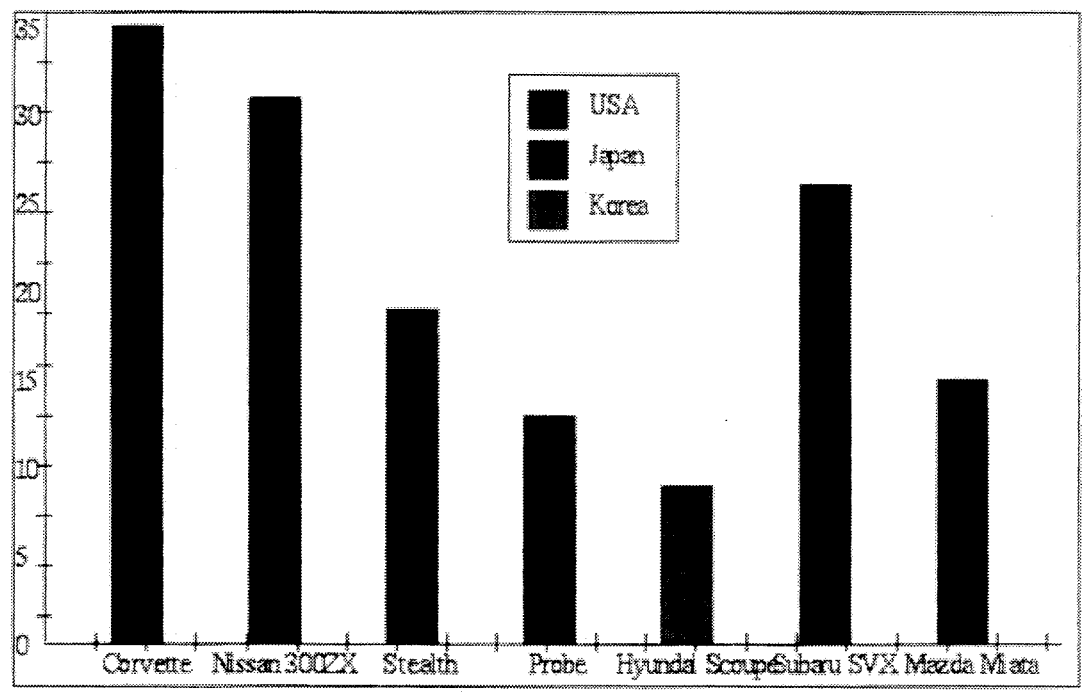
Figure 3B:
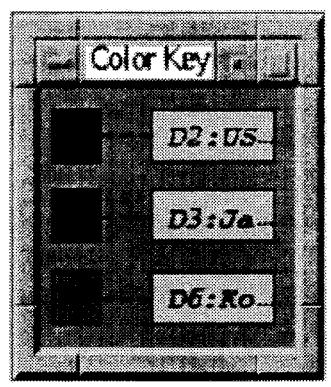

To create a graph as shown in FIG. 3c, where the color of the rectangles is used to visualize a different data value from the height (the color is used to visualize the country and the height visualizes the price), the user typically draws two rectangles of different colors. The user then typically associates cell B2 with the first bar as in Example #1, but B3 (instead of C2) with the second bar. The present system then infers that the data series for the heights of the rectangles is column B, and that it is not known how to determine the color. Therefore, a color key is displayed as shown by FIG. 3b, and the user may then specify column D2 in the first link-box of the color key. From this, a third color is selected which is different from the two the user supplied, and the bars are colored appropriately as shown in FIG. 3c. To specify a different color, the user would typically select the color key rectangle and change the color using a standard selection mechanism. After the user draws the first two bars in FIG. 3, an alternative interpretation might be the same as shown in FIG. 2, with pairs of bars. This is typically not the default guess in FIG. 3, because a heuristic that notices that the horizontal distance from the first bar to the second bar is about the same as the distance from the origin to the first bar.

If the system guesses wrong about the mapping of data, or when a user wants to be more explicit about the mapping, the user typically can directly edit an element of the picture to be correct, and the system uses this new information to refine its guesses. Alternatively, the link-boxes can be directly edited to specify the desired values.

Operation

A small number of primitives with standard composition rules may be used to create most business chart styles. For example, bar charts, column charts, and stacked bar and column charts are all composed of rectangles that change in a single dimension. One problem is that the primitives can be combined in any fashion. thus, providing all possible options is a combinatorial impossibility. By encoding the combination rules as heuristics, example drawings can be interpreted without needing to put all possible combinations in a menu.

Based upon an analysis of the types of charts typically used, the following primitives and properties have been identified:

| Graphic element | Parameters |
| --- | --- |
| bars | position, height, width, color |
| marks | position, size, color, shape (dots, squares, starts, etc.) |
| lines | position, color, line-width |
| pie segments | percentage of whole, color |
| labels | text string, position, color | where "color" may signify any filling style or hashing.

The primitives are "overloaded" since the same primitive object can be used for different purposes. For example, the bar object is used to draw horizontal bars, vertical columns, or floating rectangles in a scatter plot. It may also be used to draw a rectangle around a label to serve as a decoration.

Lines may be used to attach data values in a line chart as shown at the bottom of the Tufte Graph, or in vertical ranges as shown at the top section of the Tufte Graph, or to draw an arrow that points to a special value, discussed below. By providing only a small number of primitives, there are only a small number of concepts and terms the user needs to learn, thus making the interface simpler. Heuristics are preferably used to guess the role the graphic object is playing, and the link boxes typically provide feedback to allow the user to monitor and edit the inferences.

In general, when the user draws two objects, the present system determines what is different between them, and assumes that all differences should be explained by different data. Thus, if rectangles are drawn with different colors, heights and horizontal positions, the present system expects to find three data values to cover these, but the user can explicitly map the same data value to multiple properties, to provide redundant visualization.

Parsing the picture is made significantly easier because the system has knowledge about the types of graphs that are usually drawn. For example, it is most common for bars to be vertical with fixed widths, or horizontal with fixed heights. Bars used in pairs (FIG. 2) usually use the same colors for each pair. The present system also uses heuristics to try to determine types and properties of data in the spreadsheet. The inferred type of the data (nominal, ordinal, quantitative; dates, money, general numbers, names, etc.) is used to help guide the mappings and generalizations. These are important, for example, to allow the present system to appropriately line up the values for graphs similar to that of the Tufte Graph, even though the temperature and humidity data is by day and the precipitation is by months.

When the user associates a graphic with a data value, a number of heuristics are preferably applied to determine how the value should be mapped to the graphical properties. These preferred heuristics include:

If a rectangle has one end on the axes, the system assumes that a value controls the other end.

If a line, bar or mark has neither end near an axis, the system assumes that both ends (or the center and the size) must be accounted for (unless all the example marks are the same size). For example, two different data values control the top and bottom of the vertical lines for the temperature in the center of the Tufte Graph (the daily maximum and minimum temperatures). As soon as the user selects the data to control one end, the present system will display objects of constant size for all data values, and allow the user to map the other end later.

If two lines connect at an end-point, then the system assumes that the lines are connecting data points, as in the humidity graph at the bottom of the Tufte Graph. There might also be additional marks at the end points, as in FIG. 4.

The system uses the size of the example axes, or if there are no axes, then the size of the current window, to be the size of the desired maximum range.

When values are mapped to the objects, the present system uses heuristics to try to find the labels in the spreadsheet data. For example, the system looks above and to the left of the selected values in the spreadsheet for strings that might be labels. These are placed on the chart, as shown in FIG. 2c. However, these text strings can be directly edited. Font and style changes are remembered, but if the user edits the text, then the present system tries to guess how the new string was composed by comparing it with values in the spreadsheet. If there are no exact matches, then the string is assume to be a constant. The same heuristics are applied if the user places an example string near an axis. The heuristics know about numbering, grids, and minor and major tick marks, and will interpolate or extrapolate if the user places example number or ticks near the axes.

Figure 5:
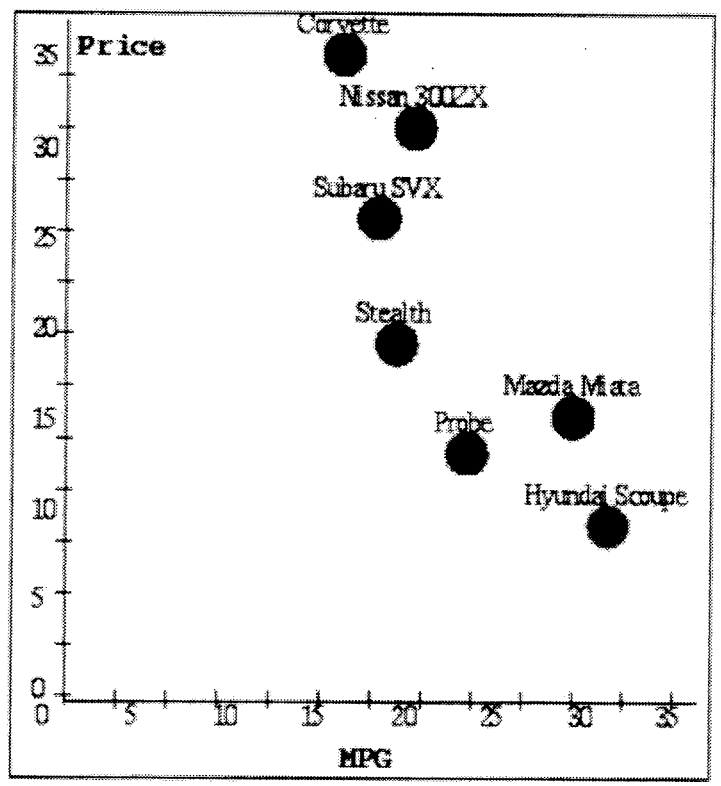
FIG. 5 is a screen display of a typical graph where the strings represent data values from a spreadsheet.

If a string is placed inside the graph (not on an axes) the system checks if it is close to another object, for which it might serve as a label. If so, then the system looks into the spreadsheet data associated with the object to see if the value in a nearby cell is the same as the string (FIG. 5). In addition to supporting labeling of objects, this feature makes it easy to create scheduling charts by simply drawing example rectangles and strings.

When objects are drawn with different colors or shapes, the system sees if these can map into different ranges of data. For example, the dots and starts in FIG. 4 map to different rows of data. If not, the present system creates a key (as in FIG. 3) and allows the user to specify the mapping. This means that color and shape cannot currently be used to represent a continuous variable (but we plan to provide an explicit command to support this).

When finding the rest of the data values for a series, the system searches down and across from the user's selection to find a range of values similar in form to the value selected. If the data changes from a number to a string or blank, this is assumed to be the end of the data. For example, in FIG. 2, after the user selects B2, the present system finds the range B2–8 since B1 is a string and B9 is blank. If the guess is incorrect, the user can draw an additional object, delete an object, or else edit the appropriate link-box.

After the user assigns the first value to an object, the present system searches to the right and down in the spreadsheet to see if there are data values of the same type. If the spreadsheet is blank in one direction, then the present system immediately uses the values in the other direction to generate more objects for the chart. If there are values in both directions, then the present system waits for more examples. This heuristic allows the system to immediately generalize from the first example for simple graphs, which minimizes the amount of information the user must supply.

A domain-specific, knowledge-intensive rule-based system is preferably used to implement the heuristics. As with typical systems that use heuristics, preferred rules for the present system were developed empirically. Because there are a small number of rules appropriate to any graphical object, sophisticated techniques from expert systems are not needed. For example, the rule-ordering has been adjusted experimentally to achieve the desired results, and the first rule that applies is used. The heuristics can create a wide variety of graphs with very little input from the user.

Fancy charts such as those used in newspapers or magazines replace the bars and marks with arbitrary graphics. For example, pictures of fish, oil barrels or people at different sizes might be used. The present system makes these kinds of graphs easy to create by allowing any of the primitives to be replaced by an arbitrary picture which the user can draw in the present system or import from another drawing program. The size of the pictures are then adjusted appropriately.

In many graphs, a particular item should be highlighted. For example, in the Tufte Graph, the highest and lowest temperatures are marked with a label and arrow. To achieve this in the present system, the user typically draws an example of the special objects, or edits a property of an existing object (for example, to make a special bar of a graph be highlighted), and uses a menu command to declare this to be a "marked" object. The present system will then try to identify why that item was chosen. For example, it might be the largest or smallest values (as in the Tufte Graph), the item with a particular value, or if nothing else applies, simply the specific item selected. A link box shows the present system's inference. As a last resort, the user can specify a spreadsheet cell which can contain a formula to compute the items to be highlighted. The present system recalculates which items to highlight when the data associated with the graph changes. If the marker is an extra object, the present system checks to see if it contains any values from the spreadsheet (as in the Tufte Graph) and adjust these as well based on the new data.

Two key issues in systems using heuristics are typically the feedback to the user to show what the system is guessing, and the ability of the user to control and edit the resulting picture. The present system provides a number of mechanisms to make these straightforward. The link-boxes show the cells of the spreadsheet that the present system has assigned to each axes, key and graphical object. The user typically can directly edit the values in the link-boxes to specify or change the referent. To avoid clutter, the link boxes are usually removed from the screen once they have been filled, but a user may choose to bring back all or selected link boxes if needed.

As soon as the present system generalizes from an example, it will the typically draw new marks or bars that correspond to the rest of the values in the spreadsheet. If the present system has generalized incorrectly, the user can typically edit one of the system-created objects to make it look right, and the present system uses this additional information to refine the inferences. In this way, fixing incorrect inferences is performed using the same direct manipulation editing that the user is familiar with, rather than requiring extra mechanisms such as question-answering, generated text, or special highlighting.

Similar editing techniques are used if the user wants to edit the display, possibly to explore the data using new views. The user can typically select portions of the display and draw replacements. For example, to change the bars in FIG. 3 to dots, the user could typically draw some dots, and use a replace command to replace them for the bars. To put time on the vertical axis instead of the horizontal one, the user can typically select and move the date labels to the left axis. Similar heuristic knowledge-based inferencing is used to interpret the edits as for the initial drawings. The semantics of the marks are used to determine how the replacement should be performed. For example, if bars of different heights are replaced by circles of different colors, the present system knows how to map the heights of the bars to various colors, whereas other systems might only replace the bars with circles of different sizes.

In a particular instance of interest, the present invention is used as an efficient way to allow a user to draw parts of an example of a desired chart, the programmable computer system then interpreting the drawing using knowledge of typical displays, then creating a complete drawing based on the actual data. An existing chart may be changed using similar techniques. This enables easy editing of the display and exploration of the data. A user may elect to draw an example of one or two data elements, and the present invention automatically draws the rest of the chart. If the data changes, the system automatically updates the chart to reflect the changed data values. The user may then directly edit the generated chart.

The preferred embodiment of the present invention, implemented on a (SUN SPARCSTATION IPX) computer running the (X WINDOW SYSTEM), currently supports many of the two-dimensional charts provided by (EXCEL), (DELTAGRAPH) and similar commercially available programs, including column charts, stacked column charts, bar carts, stacked bar charts, line charts, pie charts, area charts, scatter charts, high-low charts, and range charts. It will be recognized that other types of charts may be generated with the present invention without loss of generality. The present invention allows a user to express combinations of different charts, and control the parameterization of properties of charts, such as for showing relationships among multiple data sets (as in the Tufte Graph).

Figure 6:
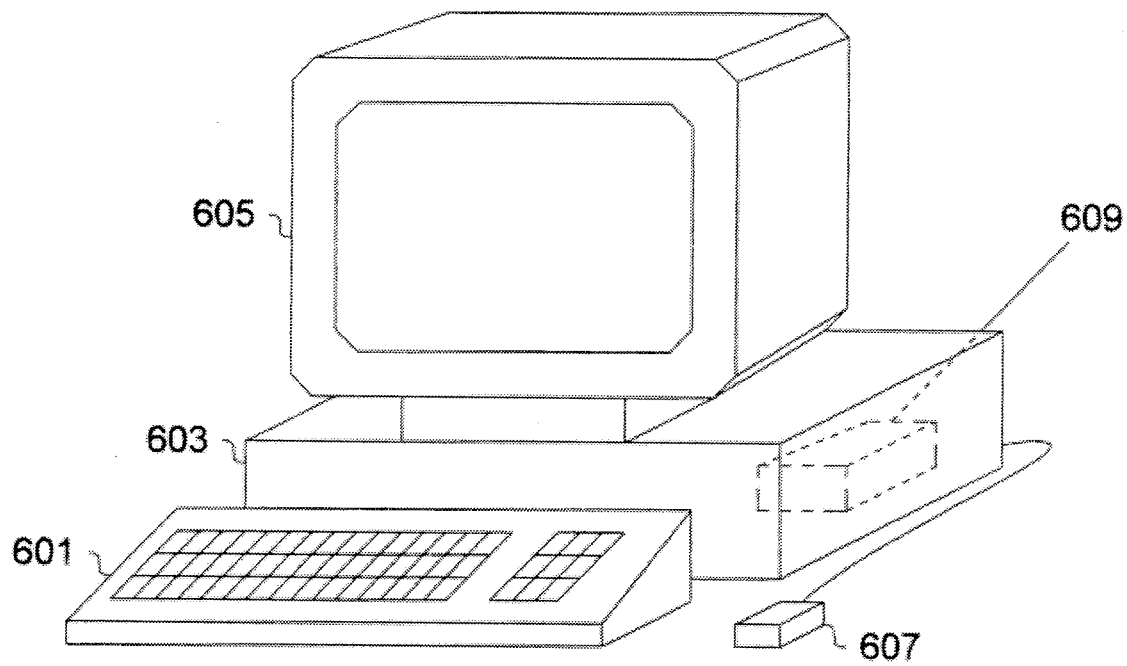
FIG. 6 is a perspective view of the components of a digital programmable computer system compatible with the present invention.

FIG. 6 shows the components of a preferred workstation that may be used with the present invention. The workstation typically includes a keyboard 601 by which a user may input data into a system, a computer chassis 603 which holds electrical components and peripherals, a screen display 605 by which information is displayed to the user, and a pointing device 607, typically a mouse, with the system components logically connected to each other via internal system bus within the computer. The invention includes a preprogrammed set of instructions which are executed on a central processing unit 609 within the computer.

Figure 9:
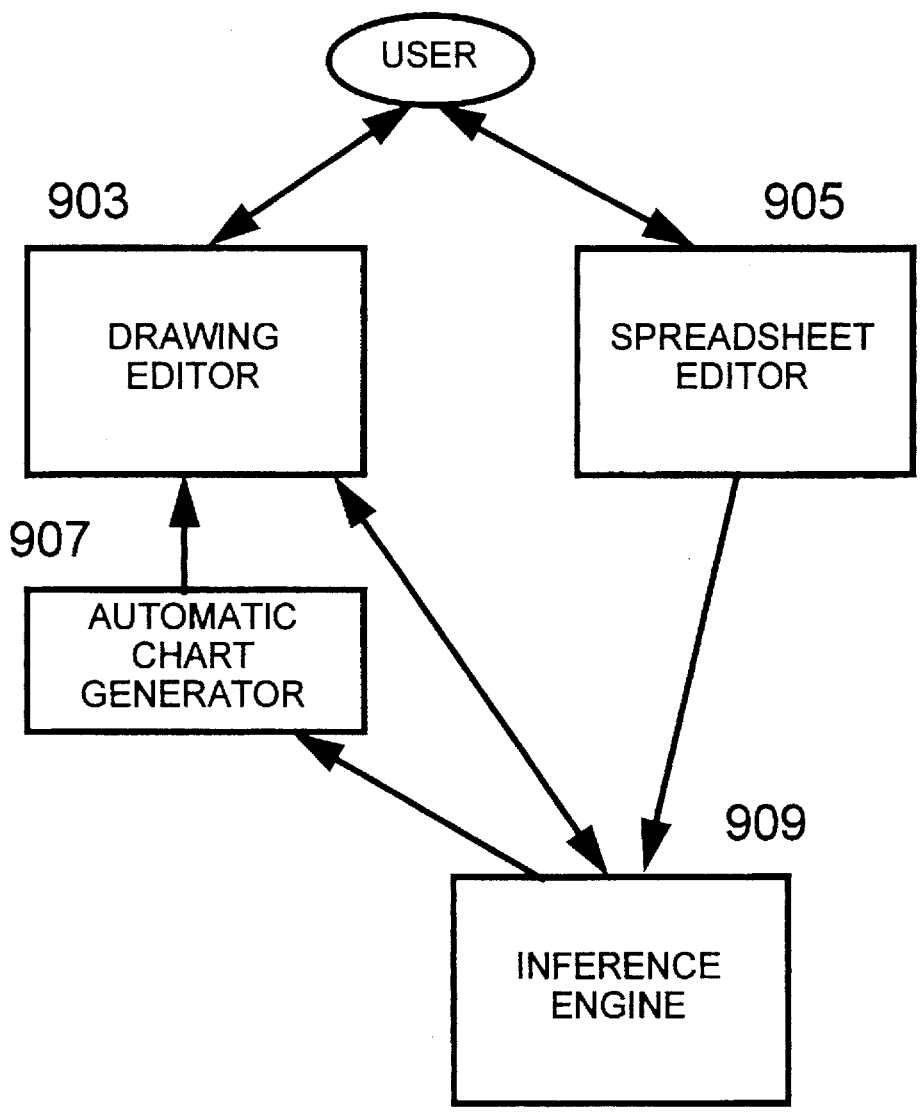
FIG. 9 is a structure chart and data flow diagram compatible with the present invention.

FIG. 9 shows the software structure of the preferred embodiment of the present invention. A user 901 interacts with a conventional drawing editor 903 (shown in FIG. 2a). An inference engine 909 interprets the user's drawings and data in the spreadsheet and then uses an automatic chart generator 907 to generate a chart corresponding to the user's drawn examples. The inference engine 909 may optionally directly change the drawings, but does not change the data in the spreadsheet.

The preferred operation of the inference engine 909 is shown in FIG. 10. The system is normally waiting for the user to input something F1.1. The user can choose to F1.2 draw an axis, F1.3 draw a new graphical object, F1.4 fill in a link-box, F1.5 edit a spreadsheet cell, or F1.6 edit an existing graphical object.

If the user draws an axis, then a link box is shown attached to the axis F1.6.5. Unless the user is drawing a pie-chart, axes are typically drawn before other graphical objects.

If the user draws a graphical object F1.3, the system determines if the object is a pie-piece F1.7. If it is a pie-piece, then one link box is drawn F1.9 diagonally outside the piece. If the object is not a pie-piece, then the system checks if the object might be the labeling for an axis F1.7.5. If it is a string or number and placed outside the axis, then it is assumed to be a label, as determined by preferred heuristics H.7. If it is a short line placed across the axis, then it is assumed to be a tic mark. If the axis is associated with a range of cells in the spreadsheet, and legal values have been determined for the axis, then use the new graphical object as an example of the formatting and values for the labels and tics F1.13 and display the rest of the labels for the axis in a similar fashion F1.14.

If the graphic is not a pie-piece or label for an axis, then preferable heuristics given by H.1 are used to determine which axes the object is probably connected to F1.8, and therefore which link boxes to display F1.9. The link boxes are usually put into a list associated with the graphical object shown in FIG. 1 typically as D1.10, and the object and axis is usually put into data structures for each link-box (FIG. 1, D2.2 and D2.3).

The preferred system next determines if the newly drawn object is associated with an existing chart F1.10. This typically uses a simple heuristic that determines whether the object is inside the bounding box of all the existing chart elements. If so, the graphic may be a marker for a particular value of the chart. For example, an arrow might point out the highest value, as shown by 703 in FIG. 7. A data item is assumed to be a special marker F1.11 if it is an arrow pointing at an item, a rectangle surrounding an item, or a text label next to an item. Markers may also be groups of objects, such as a text string in a box next to an arrow, as shown by 803 in FIG. 8. Preferred heuristics, listed in H.2, are used to determine F1.12 how the marker represents the data.

After drawing an object, the user might draw another object F1.3, repeating the process described above, or the user might fill in a link box F1.4. The user typically fills in a link box by selecting on the link box with the pointing device and then selecting on the spreadsheet cell or cells that should be associated with it. Alternatively, the spreadsheet cells can be selected first, and then the link-box selected second.

If the user selects a range of cells or a complete row or column of the spreadsheet F2.1 (shown in FIG. 10b), this typically causes the system to look for data to generate a complete chart F2.3. If the user selects a single cell, then the system usually checks the global list of cells that have been assigned, shown in FIG. 1 as D5.2. If the cell adjacent to the current cell is on the list, then the system preferably attempts to determine the range of data F2.3. The preferred heuristics used for this determination are shown in H.3.

Figure 10A:
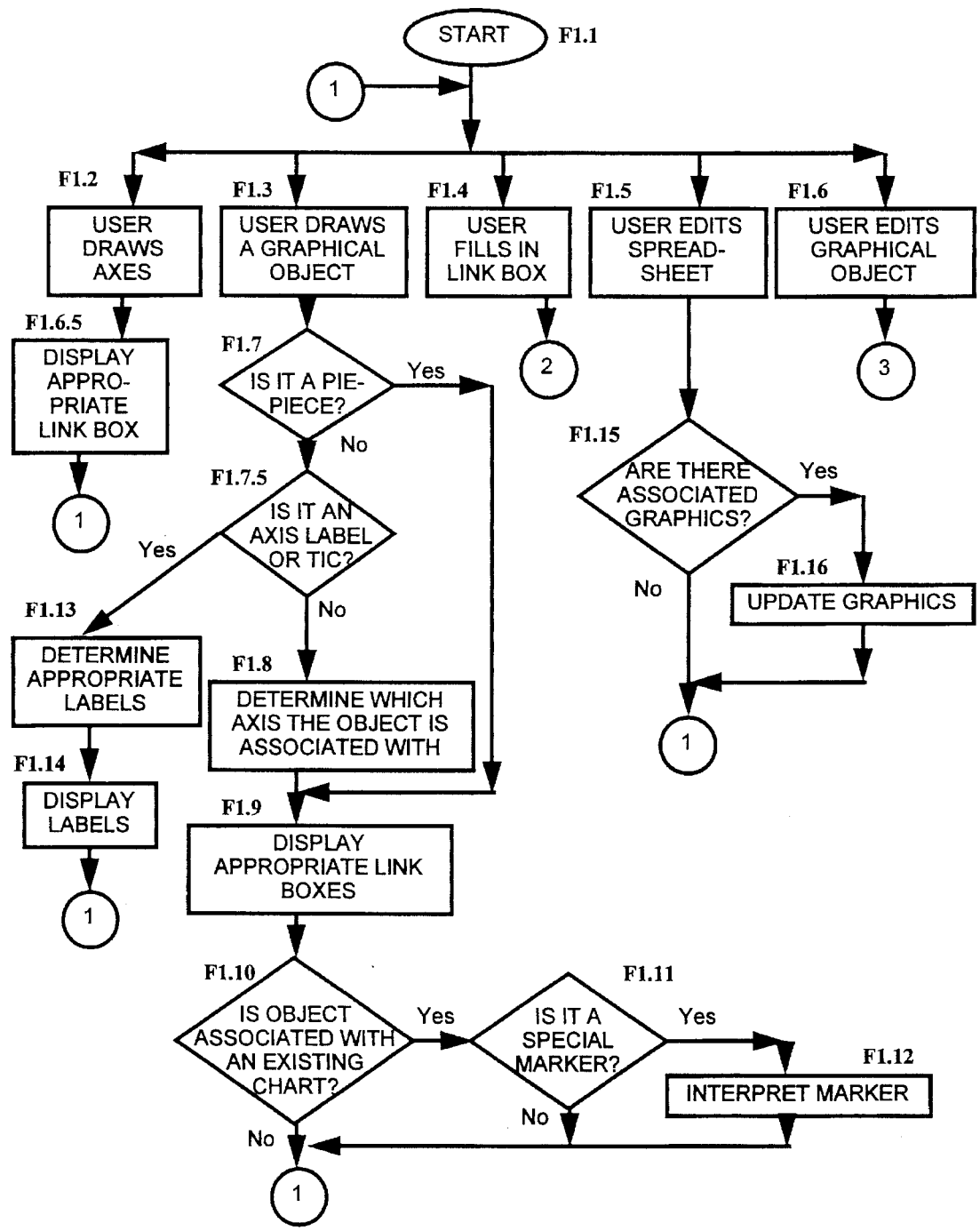
FIG. 10a is a flow diagram of software control functions compatible with the present invention.
Figure 10B:
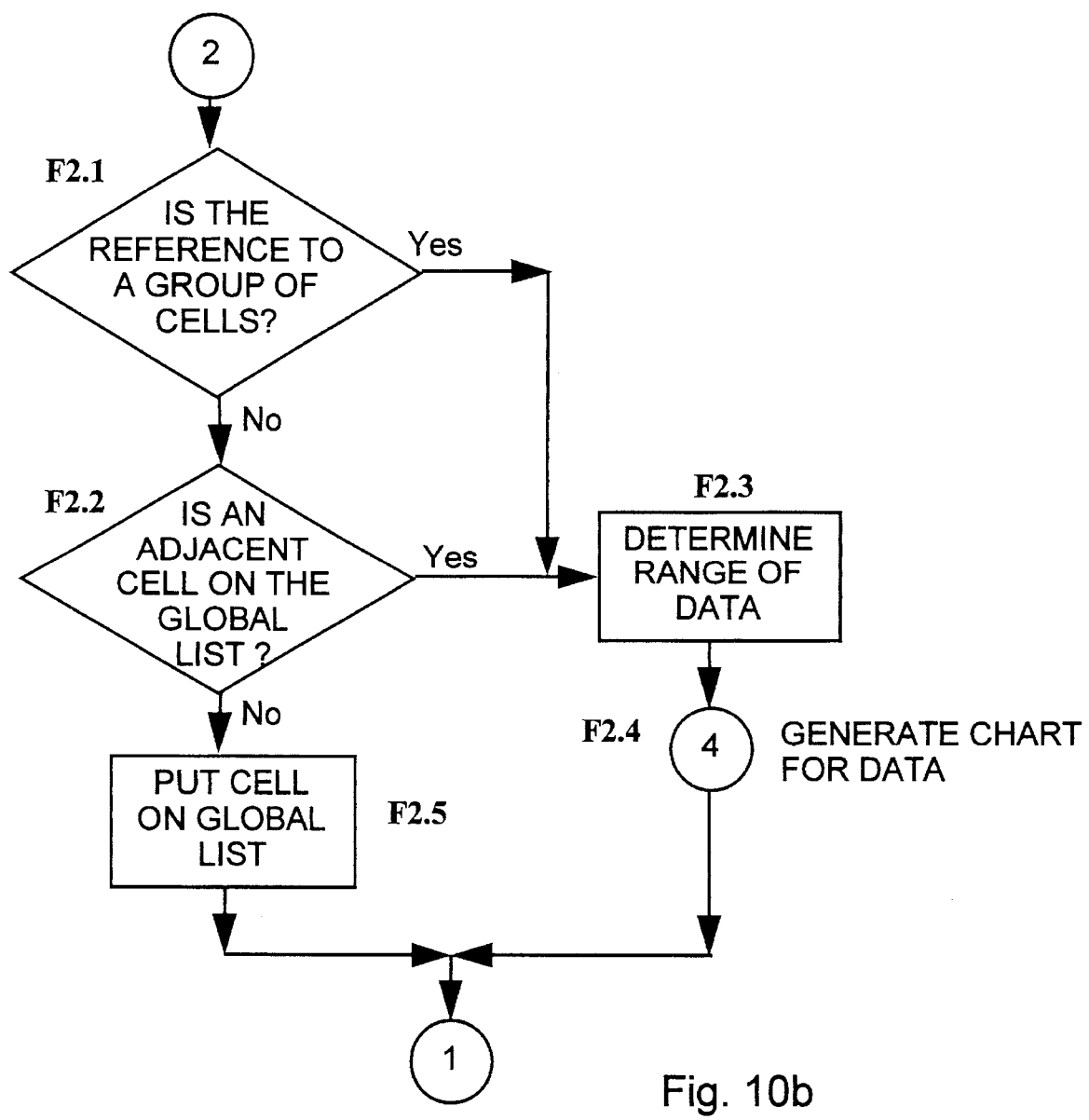
FIG. 10b is a flow diagram of a link box control function compatible with the present invention.
Figure 10C:
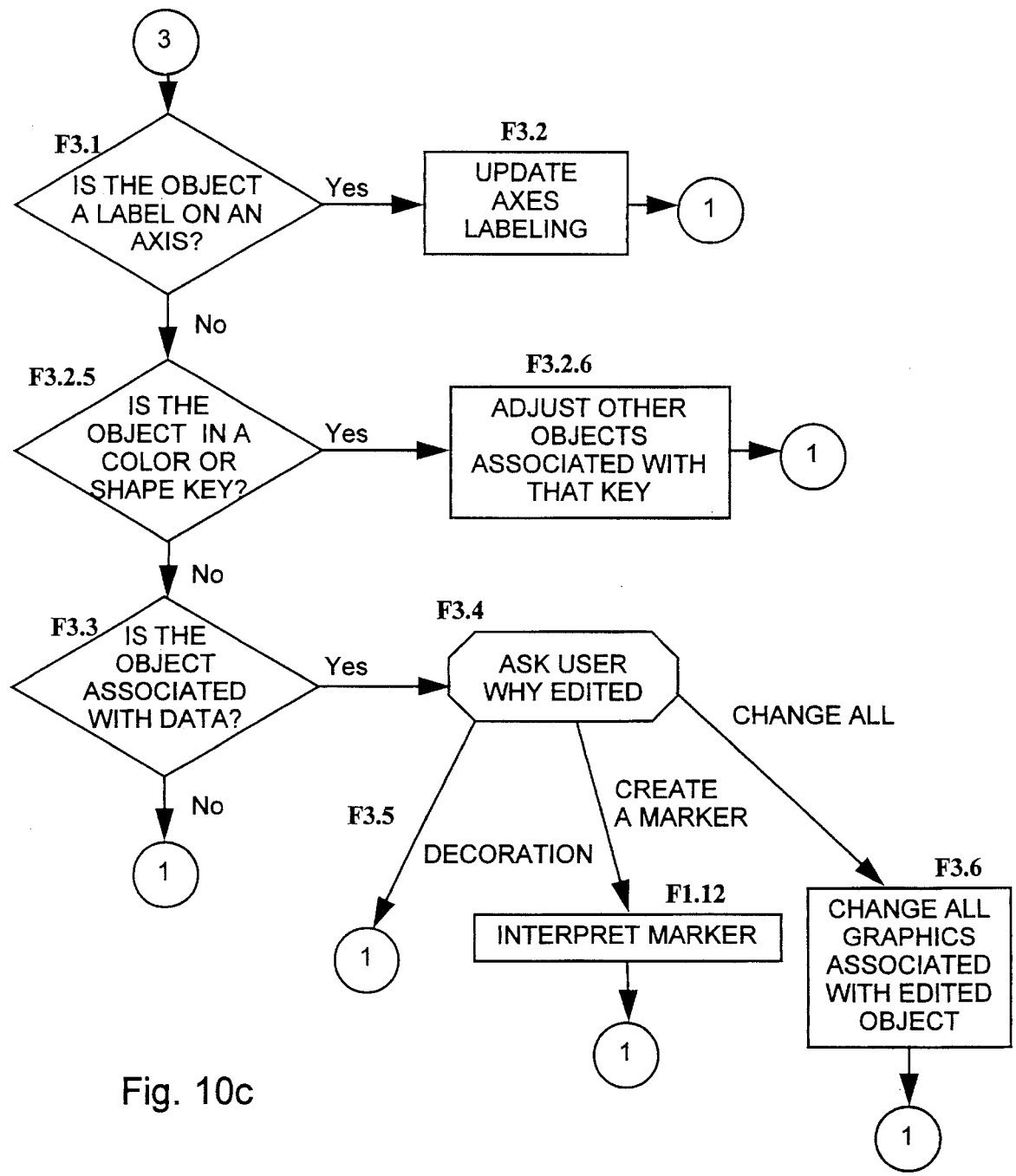
FIG. 10c is a flow diagram of a graphical object editing control function compatible with the present invention.
Figure 10D:
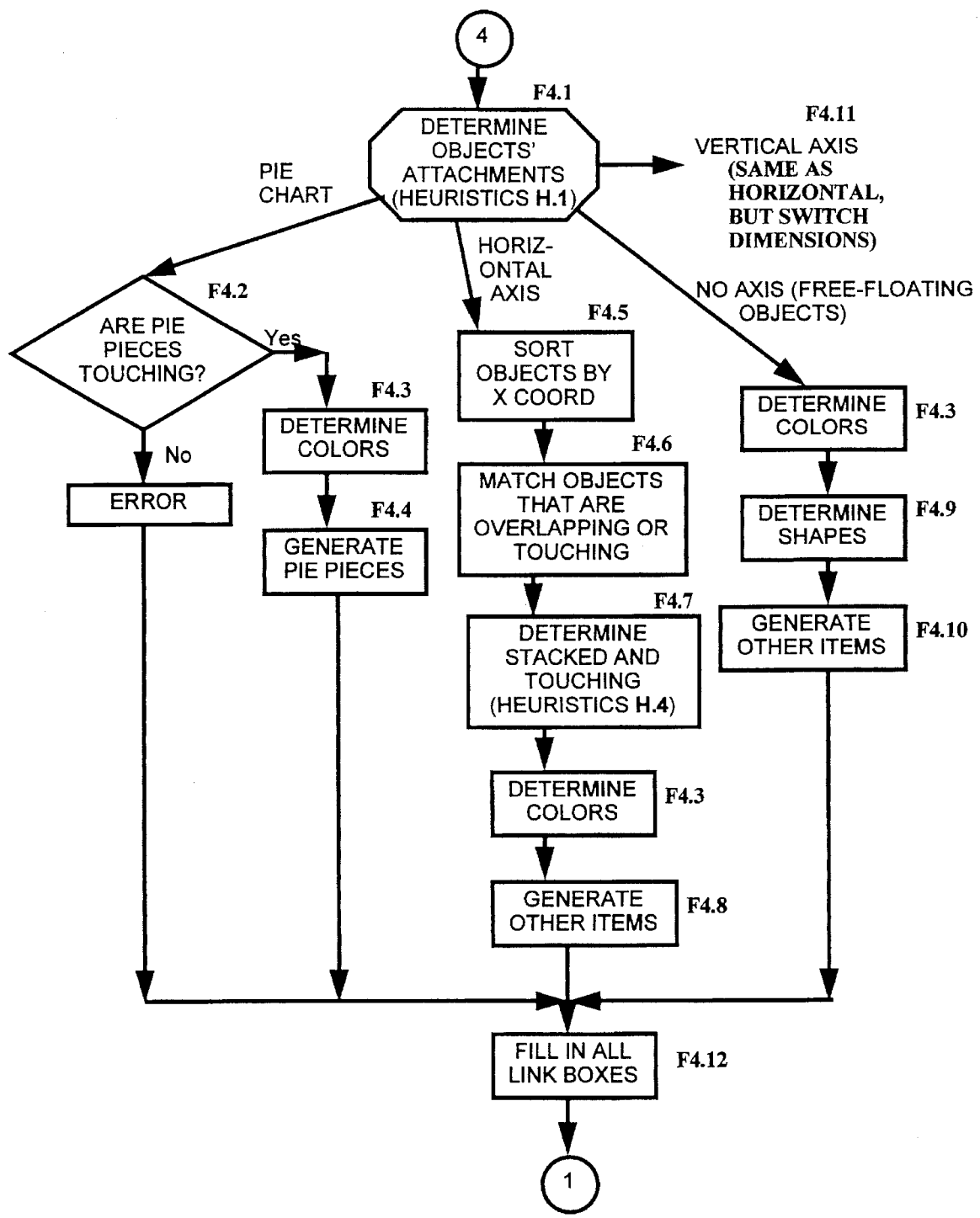
FIG. 10d is a flow diagram of a chart data generation control function compatible with the present invention.

After a range of cells is successfully determined, the system preferably attempts to determine the appropriate chart to draw, as shown in FIG. 10d. First, the information discovered about the attachment of the objects to the axes F1.8 using preferred heuristics H.1 is used to make a preliminary decision about the general type of chart F4.1.

If it is a pie-chart, then if there is more than one example pie-piece, the example pieces usually must be close-together F4.2, typically within 20 pixels. The system then typically determines what colors to use for the pieces F4.3 using preferred heuristics listed in H.5. Next, the size of the example pie piece is typically used to determine the desired size of the full pie, and pieces are generated proportional to the data discovered in step F2.3. Appropriate slots of all the graphical objects are typically set to show the type of chart D1.9 and the other objects used in the same chart D1.12 and D1.13. Finally, F4.12 link boxes associated with the generated objects are preferably filled in with the appropriate spreadsheet references.

If the example objects are attached to the horizontal axis, then the present system assumes this is some sort of vertical column chart. The objects may be sorted by the X coordinate F4.5 and then adjacent objects are typically checked to see if they overlap or touch. Preferred heuristics H.4 are then applied at F4.7 to determine whether the items are stacked to form a stacked column chart, a paired item chart such is shown in FIG. 2c, or a regular chart. When the type of chart has been determined, the colors of the objects are typically checked at F4.3 using the preferred heuristics in H.5, and the rest of the items are drawn at F4.8. If the objects are attached to the vertical axis, the same process may be used at F4.11, but rotated. Appropriate slots of all the graphical objects are set D1.9–D1.13, and link-boxes are displayed F4.12, as with pie-charts.

Figure 4:
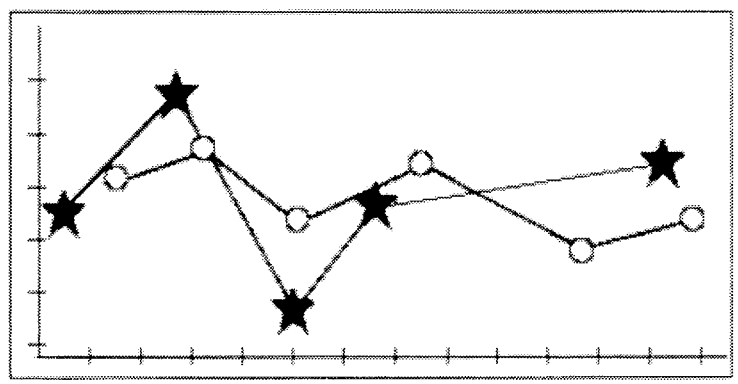
FIG. 4 is a screen display of a typical graph where the dots and stars correspond to different data series.

If the objects are not attached to axes, then it is assumed to be a scatter plot, such as shown in FIG. 4 and FIG. 5. The heuristics already discussed H.5 are used to determine whether the colors of the objects should be mapped to values F4.3. Next, a similar process is used to determine if the shapes of the objects change F4.9, and if so, what to map the shapes to. Heuristics H.6 lists these. This includes handling text strings where the value of the string should be mapped from spreadsheet data, as shown in FIG. 5. Finally, the actual chart objects can be generated F4.10. For example, the user might draw 2 vertical rectangles for a bar chart, select a range of data in the spreadsheet containing 7 numbers, and the system will adjust the original 2 rectangles to have the correct heights corresponding to the data, and then add 5 more bars of the correct heights.

If the user edits some of the data in the spreadsheet F1.5, then the system checks the list D4.3 to see if there are any objects associated with that cell F1.15. If so, then the graphical objects associated with the cell are updated F1.16. This may include changing the length or scaling of the axes if the edited cell changes the maximum value of all the cells. If the cell is mapped to a color or other property, then editing the cell might involve changing the color or object type key.

If the user edits a graphical object F1.6, either by changing its size, color or string (if text) or deleting the object, then first the system determines if this is a label for an axis F3.1 shown in FIG. 10c. If so, then the user is assumed to be modifying the labeling, so heuristics H.7 are used to determine what the new labeling should be, and the labels are updated F3.2. Otherwise, if the graphic that is edited is part of a color key or a shape key F3.2.5, then all the items associated with that key item are changed F3.2.6. For example, if the user edits a green square in the color key to be blue, then all items that were originally green turn blue. Otherwise, if the graphic is associated with data F3.3, which is may be determined by checking a slot of the object shown in FIG. 1 as D1.9, then there are three possibilities, and the user is queried as to which to perform at F3.4. First, the graphic may be just an un-interpreted decoration for the chart F3.5. Second, it may signal that the object should be a special marker for a particular value F1.12 as shown as 803 in FIG. 8, in which case the techniques described above using preferred heuristics H.2 are typically used to interpret which item to highlight. Third, the user may select all of the objects associated with the data to be modified in the same way F3.6, in which case techniques similar to those used for original drawings, described in FIG. 10a starting with F1.3, are typically used.

The present invention is to be limited only in accordance with the scope of the appended claims, since others skilled in the art may devise other embodiments still within the limits of the claims.

Microfiche Appendix

The microfiche appendix to the present patent application contains the source code for the application software running on the workstation. Copyright © 1994 Brad A. Myers and Carnegie Mellon University. It will be recognized that alternative embodiments using other programming languages and programming methodologies may be substituted without loss of generality.

What is claimed is:

1. A visualization method for producing a display chart using a programmable data processing system, comprising a data input device, a display device, and a data storage device, the method comprising the steps of:
    (a) using the data input device to provide the programmable data processing system with a drawn example graphical element and a plurality of data values;
    (b) storing the drawn example graphical element and the plurality of data values in the data storage device; and
    (c) using the programmable data processing system to automatically perform the steps of:
        (1) associating one of the plurality of data values to the drawn example graphical element, the associated data value being contained within a specified range of values;
        (2) applying one of a plurality of heuristics to the drawn example graphical element and the associated data value to determine a visualization characteristic of the graphical element, wherein the plurality of heuristics comprises a heuristic selected from the group consisting of determining the type of chart based on the type of drawn example graphical element and the proximity of the drawn example graphical element to other drawn example graphical elements and to an axis, determining the values of visualization characteristics by copying the characteristics of the drawn example graphical element, and determining the number and placement of chart elements based on the plurality of data values; and
        (3) displaying, on the display device, the display chart from the drawn example graphical element embodying the visualization characteristic, such that the display chart visualizes the specified range of values of the associated data value.

2. The visualization method of claim 1 wherein the plurality of graphical primitives includes rectangle, mark, line, pie piece, text, axis, and arbitrary picture.

3. The visualization method of claim 1 wherein the visualization characteristic includes scaling the display graphic along an x-axis, scaling the display graphic along a y-axis, repeating the display graphic, and changing the display graphic color, line style, texture, and shape.

4. The visualization method of claim 1 wherein the programmable data processing system further performs the step of determining one of a plurality of data types from one of the plurality of data values.

5. The visualization method of claim 4 wherein the plurality of data types include nominal, ordinal, time, date, money, general number, or text.

6. The visualization method of claim 1 wherein the programmable data processing system further performs the step of updating the display chart when any of the plurality of data values changes.

7. A visualization method for producing a display chart using a programmable data processing system, comprising a data input device, a display device, and a data storage device, the method comprising the steps of:
    (a) using the data input device to provide the programmable data processing system with an example movable special marker and a plurality of data values;
    (b) storing the example movable special marker and the plurality of data values in the data storage device; and
    (c) using the programmable data processing system to automatically perform the steps of:
        (1) associating one of the plurality of data values to the example movable special marker, the associated data value being contained within a specified range of values; and
        (2) applying one of a plurality of heuristics to the example movable special marker and the associated data value to determine a visualization characteristic of a graphical element of the display chart, such that the graphical element associated with the associated data value is highlighted using the example movable special marker, wherein the plurality of heuristics comprises a heuristic selected from the group consisting of determining which data value is being highlighted by determining which chart element the example movable special marker is near, determining whether a data value is a largest or smallest data value, and determining whether the example movable special marker contains a representation of a data value.

8. The visualization method of claim 7 wherein the step of drawing a movable special marker comprises editing a visualization characteristic of a graphic element as the movable special marker within the display chart, such that the data value associated with the graphic element is highlighted.

9. The visualization method of claim 8 wherein the movable special marker displays the data value associated with a highlighted graphic element.

10. The visualization method of claim 7 wherein the programmable data processing system further performs the step of updating the special marker when any of the plurality of data values changes.

11. A visualization method for producing a display chart using a programmable data processing system, comprising a data input device, a display device, and a data storage device, the method comprising the steps of:

(a) using the data input device to provide the programmable data processing system with first and second drawn example graphical elements and a plurality of data values;

(b) storing the first and second drawn example graphical elements and the plurality of data values in the data storage device; and (c) using the programmable data processing system to automatically perform the steps of:

(1) associating one of the plurality of data values to the first drawn example graphical element and one of the plurality of data values to the second drawn example graphical element;

(2) comparing the first drawn graphical element to the second drawn graphical element;

(3) determining a graphical difference between the first and second drawn example graphical elements;

(4) associating one of the plurality of data values to the graphical difference, the associated data value being contained within a specified range;

(5) applying one of a plurality of heuristics to the graphical difference and the associated data value to determine a visualization characteristic of a graphical element of the display chart, wherein the plurality of heuristics comprises a heuristic selected from the group consisting of determining which visualization characteristic differs between the first drawn example graphical element and the second drawn example graphical element, determining the type of chart based on a differing visualization characteristic, the types of the first and second drawn example graphical elements, the proximity of the first and second drawn example graphical elements to other drawn example graphical elements and to an axis, determining the values of visualization characteristics by copying the characteristics from a drawn example graphical element, and determining the number, placement and values for a differing visualization characteristic of the display chart elements based on the plurality of data values; and (6) displaying, on the display device, the display chart from the graphical difference embodying the visualization characteristic, such that the display chart visualizes the specified range of values of the associated data value.

12. The visualization method of claim 11 further comprising the step of associating one of the plurality of data values to each drawn graphical element within the example graphic.

13. The visualization method of claim 11 wherein the plurality of graphical primitives includes rectangle, mark, line, pie piece, text, axis, and arbitrary picture.

14. The visualization method of claim 11 wherein the visualization characteristic includes scaling the display graphic along an x-axis, scaling the display graphic along a y-axis, repeating the display graphic, and changing the display graphic color, line style, texture, and shape.

15. The visualization method of claim 11 wherein the programmable data processing system further performs the step of determining one of a plurality of data types from one of the plurality of data values.

16. The visualization method of claim 15 wherein the plurality of data types includes nominal, ordinal, time, date, money, general number, or text.

17. The visualization method of claim 11 wherein the programmable data processing system further performs the step of updating the display chart when any of the plurality of data values changes.

18. A system for producing a display chart from a drawn example graphical element and data values, the system comprising:

(a) a programmable data processing computer, the computer comprising a data input device, a display device, and a data storage device coupled thereto;

(b) the data storage device comprising means for storing the drawn example graphical element and the data values stored in an electronic format;

(c) association means for associating one of the data values to the drawn example graphical element, the associated data value being contained within a specified range;

(d) application means for applying one of a plurality of heuristics to the drawn example graphical element and the associated data value to determine a visualization characteristic of the graphical element, wherein the plurality of heuristics comprises a heuristic selected from the group consisting of determining the type of chart based on the type of drawn example graphical element and the proximity of the drawn example graphical element to other drawn example graphical elements and to an axis, determining the values of visualization characteristics by copying the characteristics of the drawn example graphical element, and determining the number and placement of chart elements based on the plurality of data values; and (e) graphic production means for producing, on the display device, the display chart from the drawn example graphical element embodying the visualization characteristic, such that the display chart visualizes the specified range of values of the associated data value.

19. The system of claim 18 further comprising visualization means for scaling the display graphic along an x-axis, scaling the display graphic along a y-axis, repeating the display graphic, and changing the display graphic color, line style, texture, and shape.

20. The system of claim 18 further comprising update means for updating the display chart when any of the plurality of data values changes.

21. A system for producing a display chart from a movable special marker example graphical element and data values, the system comprising:

(a) a programmable data processing computer, the computer comprising a data input device, a display device, and a data storage device coupled thereto;

(b) the data storage device comprising means for storing the drawn example graphical element and the data values stored in an electronic format;

(c) association means for associating one of the plurality of data values to the movable special marker example graphical element, the data value being contained within a specified range of values; and (d) application means for applying one of a plurality of heuristics to the movable special marker example graphical element and the data value to determine a visualization characteristic of the graphical element, such that the graphical element associated with the data value is highlighted using the movable special marker, wherein the plurality of heuristics comprises a heuristic selected from the group consisting of determining which data value is being highlighted by determining which chart element the example movable special marker is near, determining whether a data value is a largest or smallest data value, and determining whether the example movable special marker contains a representation of a data value.

22. The system of claim 21 further comprising editing means for editing a visualization characteristic of the example graphic element as the movable special marker such that the graphical element is highlighted.

23. The system of claim 22 wherein the movable special marker displays the data value associated with a highlighted graphic element.

24. The system of claim 21 further comprising update means for updating the movable special marker when any of the plurality of data values changes.

25. A system for producing a display chart from first and second drawn example graphical elements and data values, the system comprising:

(a) a programmable data processing computer, the computer comprising a data input device, a display device, and a data storage device coupled thereto;

(b) the data storage device comprising means for storing the first and second drawn example graphical elements and the data values stored in an electronic format;

(c) first association means for associating one of the plurality of data values to the first drawn example graphical element and one of the plurality of data values to the second drawn example graphical element;

(d) comparison means for comparing the first drawn example graphical element to the second drawn example graphical element;

(e) determination means for determining a graphical difference between the first and second drawn example graphical elements;

(f) second association means for associating one of the plurality of data values to the graphical difference, the associated data value being contained within a specified range;

(g) application means for applying one of a plurality of heuristics to the graphical difference and the associated data value to determine a visualization characteristic of the graphical element, wherein the plurality of heuristics comprises a heuristic selected from the group consisting of determining which visualization characteristic differs between the first drawn example graphical element and the second drawn example graphical element, the types of the first and second drawn example graphical elements, the proximity of the first and second drawn example graphical elements to other drawn example graphical elements and to an axis, determining the values of visualization characteristics by copying the characteristics from a drawn example graphical element, and determining the number, placement and values for a differing visualization characteristic of the display chart elements based on the plurality of data values; and (h) graphic production means for producing, on the display device, the display chart from the graphical difference embodying the visualization characteristic, such that the display chart visualizes the specified range of values of the associated data value.

26. The system of claim 25 further comprising visualization means for scaling the display graphic along an x-axis, scaling the display graphic along a y-axis, and repeating the display graphic, and changing the display graphic color, line style, texture, and shape.

27. The system of claim 25 further comprising update means for updating the display chart when any of the plurality of data values changes.

* * * * *